(12) United States Patent
Ilo (10) Patent No.: US 9,722,261 B2
(45) Date of Patent: Aug. 1, 2017

(54) FUEL CELL SYSTEM

(71) Applicant: TOYOTA JIDOSHA KABUSHIKI KAISHA, Toyota-shi, Aichi-ken (JP)

(72) Inventor: Atsuo Ilo, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 34 days.

(21) Appl. No.: 14/847,450

(22) Filed: Sep. 8, 2015

(65) Prior Publication Data
US 2016/0126566 A1    May 5, 2016

(30) Foreign Application Priority Data

Nov. 5, 2014  (JP) ................................ 2014-225638

(51) Int. Cl.
| | |
|---|---|
| *H01M 8/04* | (2016.01) |
| *H01M 8/04111* | (2016.01) |
| *H01M 8/04492* | (2016.01) |
| *H01M 8/04537* | (2016.01) |
| *H01M 8/04746* | (2016.01) |

(52) U.S. Cl.
CPC .... *H01M 8/04111* (2013.01); *H01M 8/04492* (2013.01); *H01M 8/04559* (2013.01); *H01M 8/04649* (2013.01); *H01M 8/04753* (2013.01); *H01M 8/04776* (2013.01)

(58) Field of Classification Search
CPC ........... H01M 8/0411; H01M 8/04492; H01M 8/04559; H01M 8/04649; H01M 8/04753; H01M 8/04776
See application file for complete search history.

(56) References Cited

U.S. PATENT DOCUMENTS

2009/0044994 A1* 2/2009 Brighton, II .......... B60L 11/005
                                                                     180/65.31

FOREIGN PATENT DOCUMENTS

| | | | |
|---|---|---|---|
| JP | H03-100398 A | 4/1991 | |
| JP | 2007-257956 A | 10/2007 | |
| JP | 2009-087857 A | 4/2009 | |
| JP | 2009-123550 A | 6/2009 | |
| JP | WO 2013129521 A1 * | 9/2013 | ........ H01M 8/04089 |

* cited by examiner

*Primary Examiner* — Gregg Cantelmo
(74) *Attorney, Agent, or Firm* — Andrews Kurth Kenyon LLP (57) ABSTRACT

When it is judged that a fuel cell stack is drying up, recovery control is performed. In recovery control, the cathode pressure control valve is controlled so that the cathode pressure becomes an increased cathode pressure, a discharge flow rate of air of a turbocompressor is set to an increased flow rate of air, and a bypass control valve is controlled so that a flow rate of air which is fed to the fuel cell stack is maintained at the requested flow rate of air. Furthermore, a combination of an increased cathode pressure and increased flow rate of air for minimizing the amount of consumed power of the turbocompressor required for eliminating dry-up is set based on the requested flow rate of air of the fuel cell stack.

5 Claims, 6 Drawing Sheets

$$\frac{(PCI, qAI)_1 \quad \cdots\cdots\cdots \quad (PCI, qAI)_n}{qARS}$$

FUEL CELL SYSTEM

RELATED APPLICATIONS

This application claims the benefit of JP Application No. 2014-225638 filed Nov. 3, 2014, the entire disclosure of which is incorporated by reference herein.

TECHNICAL FIELD

The present invention relates to a fuel cell system.

BACKGROUND ART

A fuel cell system is known in the art which is provided with a fuel cell stack which generates electricity by an electrochemical reaction between a fuel gas and oxidant gas, an oxidant gas feed pipe which is connected to an inlet of an oxidant gas passage which is formed in the fuel cell stack, a turbocompressor which is arranged in the oxidant gas feed pipe and which feeds oxidant gas, a bypass pipe which branches off from the oxidant gas feed pipe downstream of the turbocompressor, a bypass control valve which controls the amount of oxidant gas which is discharged from the turbocompressor and fed to the fuel cell stack and the amount of oxidant gas which is discharged from the turbocompressor and flows into the bypass pipe, a cathode off-gas pipe which is connected to an outlet of the oxidant gas passage, and a cathode pressure control valve which is arranged in the cathode off-gas pipe and which controls the pressure inside of the oxidant gas passage as the cathode pressure.

In general, in the entire region where the operating point of a turbocompressor can fall, which is determined by a pressure ratio and discharge quantity of oxidant gas of the turbocompressor, a nonsurge region where surging does not occur at the turbocompressor is defined at the side where the pressure ratio is low and the discharge quantity of oxidant as is high, while a surge region where surging can occur at the turbocompressor is defined at the side where the pressure ratio is high and the discharge quantity of oxidant gas is small. That is, if the turbocompressor is operated with an operating point falling in the surge region, surging is liable to occur in the turbocompressor.

Therefore, a fuel cell system is known in the art which sets the discharge quantity of oxidant gas of the turbocompressor to an increased quantity larger than the requested quantity of oxidant gas of the fuel cell stack by an excess amount so that the operating point of the turbocompressor falls in the nonsurge region, when the demanded operating point of the turbocompressor falls in the surge region. This known fuel cell system also controls the bypass control valve so that the excess in the oxidant gas which is discharged from the turbocompressor flows into the bypass pipe in order to maintain the amount of oxidant gas which is fed to the fuel cell stack at the requested quantity of oxidant gas, when the demanded operating point of the turbocompressor falls in the surge region (for example, see Japanese Patent Publication No. 2009-123550A). By doing this, the amount of oxidant gas which is fed to the fuel cell stack is maintained at the requested quantity of oxidant gas while surging is prevented from occurring at the turbocompressor.

On the other hand, a fuel cell system is also known in the art in which it is judged if the fuel cell stack is drying up and, when it is judged that the fuel cell stack is drying up, the opening degree of the cathode pressure control valve is reduced so that the cathode pressure is raised to an increased cathode pressure. If the cathode pressure has risen, the amount of moisture which condenses inside the oxidant gas passage becomes greater. Further, if the opening degree of the cathode pressure control valve is made smaller to make the cathode pressure rise, the amount of cathode off-gas which flows out from the oxidant gas passage in the fuel cell stack becomes smaller, so the amount of moisture which flows out to the outside of the fuel cell stack accompanying the cathode off-gas decreases. As a result, the degree of humidity of oxidant gas passage rises and the drying up of the fuel cell stack is eliminated. In this case, the higher the increased cathode pressure, the shorter the time required for eliminating the drying up of the fuel cell stack.

SUMMARY

Technical Problem

In the fuel cell system described in Japanese Patent Publication No. 2009-123550A as well, the above art for rising the cathode pressure so as to eliminate dry-up can be used. In this regard, if the cathode pressure has risen, the pressure ratio of the turbocompressor is also risen. Therefore, if the cathode pressure has risen while maintaining the discharge quantity of oxidant gas of the turbocompressor at the requested quantity of oxidant gas of the fuel cell stack, the operating point of the turbocompressor is liable to shift to inside the surge region. On this point, in the fuel cell system which is described in this reference, it may be considered to set the discharge quantity of oxidant gas of the turbocompressor or the excess so that the operating point of the turbocompressor falls in the nonsurge region. That is, the cathode pressure has risen to the increased cathode pressure so that drying up of the fuel cell stack is eliminated, while the discharge quantity of oxidant gas of the turbocompressor is increased to the increased quantity of oxidant gas so that the operating point of the turbocompressor falls in the nonsurge region.

However, there are several combinations of the increased cathode pressure required for eliminating drying up of the fuel cell stack and the increased quantity of oxidant gas required for maintaining the operating point of the turbocompressor in the nonsurge region. Therefore, it is necessary to determine the optimal combination from among the plurality of combinations. This reference does not disclose or suggest this point.

Solution to Problem

According to embodiments of the present invention, there is provided a fuel cell system which includes a fuel cell stack which is configured to generate electricity by an electrochemical reaction between a fuel gas and oxidant gas; an oxidant gas feed pipe which is connected to an inlet of an oxidant gas passage which is formed in the fuel cell stack; a turbocompressor which is arranged in the oxidant gas feed pipe and which is configured to feed oxidant gas; a bypass pipe which branches off from the oxidant gas feed pipe downstream of the turbocompressor; a bypass control valve which is configured to control the amount of oxidant gas which is discharged from the turbocompressor and fed to the fuel cell stack and the amount of oxidant gas which is discharged from the turbocompressor and flows into the bypass pipe; a cathode off-gas pipe which is connected to an outlet of the oxidant gas passage; a cathode pressure control valve which is arranged in the cathode off-gas pipe and which is configured to control the pressure inside of the oxidant gas passage as the cathode pressure; and a controller which is configured to judge if the fuel cell stack is drying up ("dry-up"), and is configured to perform normal control when it is judged that the fuel cell stack is not drying up and to perform recovery control for eliminating the dry-up when it is judged that the fuel cell stack is drying up, wherein, an entire region where the operating point of the turbocompressor can fall, which is determined by a pressure ratio and discharge quantity of oxidant gas of the turbocompressor, includes a nonsurge region where surging does not occur at the turbocompressor and is defined at the side where the pressure ratio is low and the discharge quantity of oxidant gas is high, and a surge region where surging can occur at the turbocompressor and is defined at the side where the pressure ratio is high and the discharge quantity of oxidant gas is small, wherein, in the normal control, the cathode pressure control valve is controlled so that the cathode pressure becomes a predetermined base cathode pressure, the discharge quantity of oxidant gas of the turbocompressor is set to the requested quantity of oxidant gas of the fuel cell stack, the bypass control valve is controlled so that the entire amount of oxidant gas which is discharged from the turbocompressor is fed to the fuel cell stack to thereby make the amount of oxidant gas which is fed to the fuel cell stack equal to the requested quantity of oxidant gas, and the operating point of the turbocompressor determined by the base cathode pressure and the requested quantity of oxidant gas falls into in the nonsurge region, wherein, in the recovery control, the cathode pressure control valve is controlled so that the cathode pressure becomes an increased cathode pressure higher than the base cathode pressure, the discharge quantity of oxidant gas of the turbocompressor is set to an increased quantity of oxidant gas greater than the requested quantity of oxidant gas of the fuel cell stack by an excess amount, the bypass control valve is controlled so that the excess in the oxidant gas which is discharged from the turbocompressor flows into the bypass pipe to thereby maintain the amount of oxidant gas which is fed to the fuel cell stack at the requested quantity of oxidant gas, and the operating point of the turbocompressor determined by the increased cathode pressure and the requested quantity of oxidant gas falls into the surge region and she operating point of the turbocompressor determined by the increased cathode pressure and the increased quantity of oxidant gas falls in the nonsurge region, and, wherein, in the recovery control, furthermore, a combination of the increased cathode pressure and the increased quantity of oxidant gas which makes the amount of consumed power of the turbocompressor requited for eliminating the dry-up is minimized based on the requested quantity of oxidant as of the fuel cell stack.

Advantageous Effects of Embodiments of the Present Invention

It is possible to maintain the amount of consumed power of the turbocompressor small and prevent surging of the turbocompressor while reliably eliminating dry-up of the fuel cell stack.

Embodiments of the present invention may be more fully understood from the description of the preferred embodiments as set forth below, together with the accompanying drawings.

DESCRIPTION OF EMBODIMENTS

Figure 1:
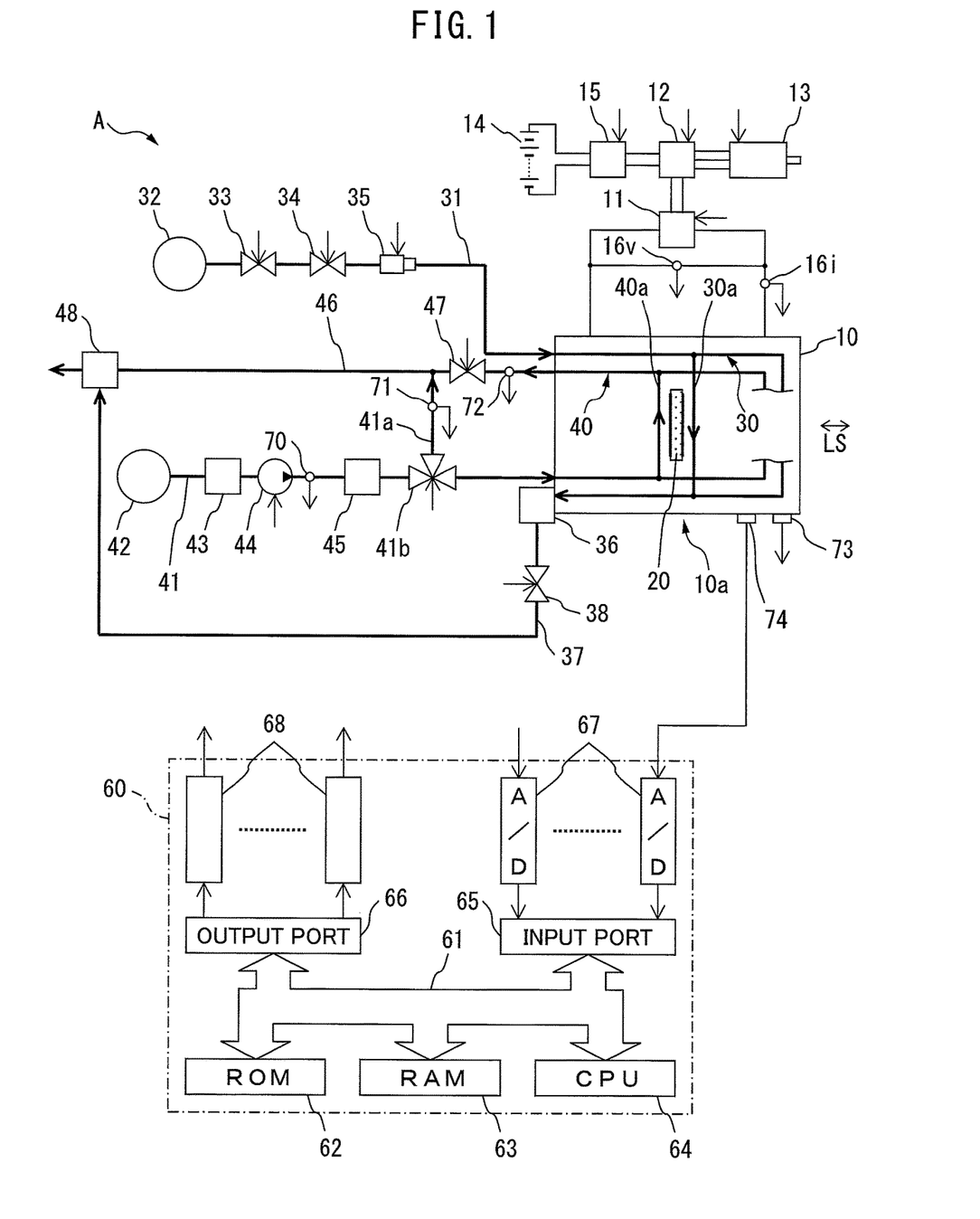
FIG. 1 is an overview of a fuel cell system.

Referring to FIG. 1, a fuel cell system A is provided with a fuel cell stack 10. The fuel, cell stack 10 is provided with a plurality of fuel cell monocells 10a which are stacked over each other in a stacking direction LS. Each fuel cell monocell 10a includes a membrane-electrode assembly 20. The membrane-electrode assembly 20 is provided with a membrane-shaped electrolyte, an anode which is formed at one side of the electrolyte, and a cathode which is formed at the other side of the electrolyte.

The anodes and cathodes of the fuel cell monocells 10a are respectively electrically connected in series. The outermost anode and cathode in the stacking direction LS constitute the electrodes of the fuel cell stack 10. The electrodes of the fuel cell stack 10 are electrically connected through a DC/DC converter 11 to an inverter 12, while the inverter 12 is electrically connected to a motor-generator 13. Further, the fuel cell system A is provided with an accumulator 14. This accumulator 14 is electrically connected through a DC/DC converter 15 to the above-mentioned inverter 12. The DC/DC converter 11 is for raising the voltage from the fuel cell stack 10 and sending it to the inverter 12, while the inverter 12 is for converting the DC current from the DC/DC converter 11 or accumulator 14 to an AC current. The DC/DC converter 15 is for making the voltage from the fuel cell stack 10 or motor-generator 13 to the accumulator 14 lower or for making the voltage from the accumulator 14 to the motor-generator 13 higher. Note that in the fuel cell system A which is shown in FIG. 1, the accumulator 14 is comprised of a battery.

Further, inside each fuel cell monocell 10a, a hydrogen gas flow passage 30a is provided for feeding a fuel gas constituted of hydrogen to a hydrogen gas anode and an air flow passage 40a is provided for feeding an oxidant gas constituted of air to a cathode. Between two adjoining fuel cell monocells 10a, a cooling water flow passage (not shown) is formed for feeding cooling water to the fuel cell monocells 10a. By respectively connecting in parallel the hydrogen gas flow passages 30a, air flow passages 40a, and cooling water flow passages of the plurality of fuel cell monocells 10a, the fuel cell stack 10 is formed with a hydrogen gas passage 30, air passage 40, and cooling water passage (not shown). In the fuel cell system A which is shown in FIG. 1, the inlets and outlets of the hydrogen gas passage 30, air passage 40, and cooling water passage are respectively arranged at one end of the fuel cell stack 10 in the stacking direction LS.

In the fuel cell system A which is shown in FIG. 1, the inlet of the hydrogen gas flow passage 30a and the outlet of the air flow passage 40a are arranged at one side of the stacking direction axial line LS, while the outlet of the hydrogen gas flow passage 30a and the inlet of the air flow passage 40a are arranged at the other side of the stacking direction axial line LS. Therefore, the direction of the hydrogen gas which flows through the hydrogen gas flow passage 30a and the direction of the air which flows through the air flow passage 40a are substantially opposite to each other. That is, the fuel cell stack 10 is comprised of a counter flow type fuel cell stack. In another embodiment (not shown), the inlet and output of the hydrogen gas flow passage 30a and the inlet and outlet of the air flow passage 40a are arranged adjoining each other and, therefore, the direction of the hydrogen gas which flows through the hydrogen gas flow passage 30a and the direction of the air which flows through the air flow passage 40a are substantially the same. That is, in this other embodiment, the fuel cell stack 10 is comprised of a parallel flow type fuel cell stack.

The inlet of the hydrogen gas passage 30 is connected to a hydrogen gas feed pipe 31, while the hydrogen gas feed pipe 31 is connected to a hydrogen gas source, for example, a hydrogen tank 32. Inside of the hydrogen gas feed pipe 31, in order from the upstream side, an electromagnetic type cutoff valve 33, a regulator 34 which adjusts the pressure inside of the hydrogen gas feed pipe 31, and a hydrogen gas feeder 35 for feeding hydrogen gas from the hydrogen gas source 32 to the fuel cell stack 10 are arranged. In the fuel cell system A which is shown in FIG. 1, the hydrogen gas feeder 35 is comprised of an electromagnetic type hydrogen gas feed valve. This hydrogen gas feed valve is provided with a needle valve. Therefore, hydrogen gas is intermittently fed from the hydrogen gas feed valve. On the other hand, the outlet of the hydrogen gas passage 30 is connected through a buffer tank 36 to a purge pipe 37. Inside the purge pipe 37, an electromagnetic type purge control valve 38 is arranged. If the cutoff valve 33 and the hydrogen gas feed valve 35 are opened, hydrogen gas inside the hydrogen tank 32 is fed through the hydrogen gas feed pipe 31 to the inside of the hydrogen gas passage 30 in the fuel cell stack 10. At this time, the gas which flows out from the hydrogen gas passage 30, that is, the anode off-gas, flows into the buffer tank 36 and is accumulated in the buffer tank 36. The purge control valve 38 is normally closed and is periodically opened for short periods of time. If the purge control valve 38 is opened, the anode off-gas inside the buffer tank 36 is exhausted through the purge pipe 37 to the atmosphere, that is, purging is performed.

In the fuel cell system A which is shown in FIG. 1, the outlet of the purge pipe 37 is in communication with the atmosphere. That is, the outlet of the hydrogen gas passage 30 is not in communication with the hydrogen gas feed pipe 31, therefore is separated from the hydrogen gas feed pipe 31. This means that the anode off-gas which flows out from the outlet of the hydrogen gas passage 30 will not return to the hydrogen gas feed pipe 31. In other words, the fuel cell system A which is shown in FIG. 1 is a non-hydrogen gas circulating type. In another embodiment (not shown), the outlet of the hydrogen gas passage 30 is connected through a hydrogen gas return pipe to for example, the hydrogen gas feed pipe 31 between the regulator 34 and the hydrogen gas feed valve 35. Inside the hydrogen gas return pipe, in order from the upstream side, a gas-liquid separator and a hydrogen gas return pump which sends hydrogen gas which was separated by the gas-liquid separator to the hydrogen gas feed pipe 31 are arranged. In this case, the anode off-gas which contains the hydrogen gas is returned through the hydrogen gas return pipe to the hydrogen gas feed pipe 31. As a result, the mixture of the hydrogen gas from the hydrogen gas source 32 and the hydrogen gas from the hydrogen gas return pipe is fed from the hydrogen gas feed valve 35 to the fuel cell stack 10. That is, in this other embodiment, the fuel cell system A is a hydrogen gas circulating type. Compared with this other embodiment, in the fuel cell system A which is shown in FIG. 1, the hydrogen gas return pipe, hydrogen gas return pump, etc. are omitted. As a result, in the fuel cell system A which is shown in FIG. 1, the configuration is simplified, the cost is reduced, and space for the hydrogen gas return pipe etc. is not required.

Further, the inlet of the air passage 40 is connected to an air feed pipe 41, while the air feed pipe 41 is connected to an air source, for example, the atmosphere 42. Inside the air feed pipe 41, in order from the upstream side, a gas cleaner 43, a turbocompressor 44 for sending air under pressure, and an intercooler 45 for cooling the air which is sent from the turbocompressor 44 to the fuel cell stack 10 are arranged. In the embodiment which is shown in FIG. 1, the turbocompressor 44 is comprised of a centrifugal type or axial flow type of turbocompressor. On the other hand, the outlet of the air passage 40 is connected to a cathode off-gas pipe 46. When the turbocompressor 44 is driven, air is fed through the air feed pipe 41 to the air passage 40 inside of the fuel cell stack 10. The gas which flows out from the air passage 40 at this time, that is, the cathode off-gas, flows into the cathode off-gas pipe 46. Inside the cathode off-gas pipe 46, in order from the upstream side, an electromagnetic type cathode pressure control valve 47 for controlling the pressure inside of the air passage 40, that is, the cathode pressure, and a diluter 48 are arranged. This diluter 48 is connected to the above-mentioned purge pipe 37. As a result, the hydrogen gas in the purge gas from the purge pipe 37 is diluted by the cathode off-gas. In the fuel cell system A which is shown in FIG. 1, furthermore, a bypass pipe 41a which branches off from the air feed pipe 41 downstream of the intercooler 45 and reaches the cathode off-gas pipe 46 downstream of the cathode pressure control valve 47, and a bypass control valve 41b which controls the amount of air which is discharged from the turbocompressor 44 and fed to the fuel cell stack 10 and the amount of air which is discharged from the turbocompressor 44 and flows into the bypass pipe 41a in the air, are provided.

The inlet of the above-mentioned cooling water passage in the fuel cell stack 10 is connected to one end of a cooling water feed pipe (not shown), while the outlet of the cooling water passage is connected to the other end of the cooling water feed pipe. Inside of the cooling water feed pipe, a cooling water pump for pumping the cooling water and a radiator are arranged. If the cooling water pump is driven the cooling water which is discharged from the cooling water pump flows through the cooling water feed pipe to the inside of the cooling water passage inside the fuel cell stack 10, then passes through the cooling water passage and flows into the cooling water feed pipe and then returns through the radiator to the cooling water pump.

An electronic control unit 60 is comprised of a digital computer and is provided with components which are connected to each other through a bidirectional bus 61 such as a ROM (read only memory) 62, RAM (random access memory) 63, CPU (microprocessor) 64, input port 65, and output port 66. The fuel cell stack 10 is provided with a voltmeter 16v and an ammeter 16i which respectively detect the output voltage and output current of the fuel cell stack 10. Further, the air feed pipe 41 between the turbocompressor 44 and the bypass control valve 41b is provided with a flow rate sensor 70 which detects the discharge flow rate of air qATC from the turbocompressor 44, while the bypass pipe 41a is provided with a flow rate sensor 71 which detects the flow rate of air which is sent into the bypass pipe 41a. Furthermore, the cathode off-gas pipe 46 upstream of the cathode pressure control valve 47 is provided with a pressure sensor 72 for detecting the cathode pressure. Furthermore, a temperature sensor 73 for detecting a temperature of the fuel cell stack 10 and an impedance sensor 74 which detects an impedance of the fuel cell stack 10 are provided. The output signals of the voltmeter 16v, ammeter 16i, flow rate sensors 70, 71, pressure sensor 72, temperature sensor 73, and impedance sensor 74 are input through corresponding AD converters 67 to the input port 65. On the other hand, the output port 66 is electrically connected through the corresponding drive circuits 68 to the DC/DC converter 11, inverter 12, motor-generator 13, DC/DC converter 15, cutoff valve 33, regulator 34, hydrogen gas feed valve 35, purge control valve 38, bypass control valve 41b, turbocompressor 44, and cathode pressure control valve 47.

When the fuel cell stack 10 should be started up, that is, when the fuel cell stack 10 should generate power, the cutoff valve 33 and hydrogen gas feed valve 35 are opened and hydrogen gas is fed to the fuel cell stack 10. Further, the turbocompressor 44 is driven and air is fed to the fuel cell stack 10. As a result, at the fuel cell stack 10, an electrochemical reaction ($H_2 \rightarrow 2H^+ + 2e^-$, $(\frac{1}{2})O_2 + 2H^+ + 2e^- \rightarrow H_2O$) occurs and electrical energy is generated. This generated electrical energy is sent to the motor-generator 13. As a result, the motor-generator 13 is operated as an electric motor for driving a vehicle, and the vehicle is driven. On the other hand, for example, when braking the vehicle, the motor-generator 13 is operated as a recovery device. The electrical energy which is recovered at this time is accumulated in the accumulator 14.

Figure 2:
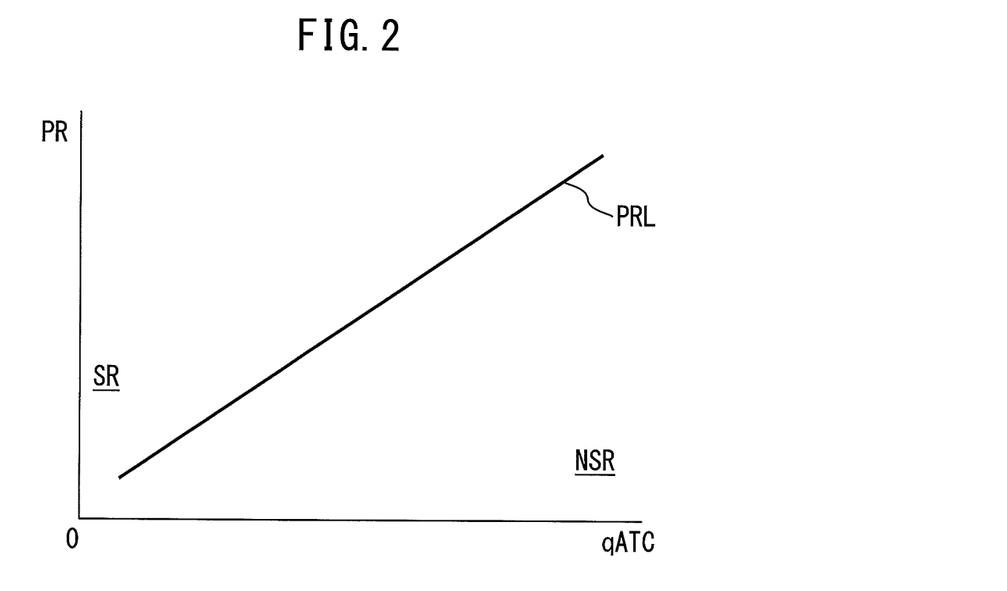
FIG. 2 is a graph which explains a surge region and nonsurge region of a turbocompressor.

FIG. 2 shows a surge region SR and nonsurge region NSR which are defined in the region where the operating point of the turbocompressor 44, which is determined by the pressure ratio PR and discharge flow rate of air qATC of the turbocompressor 44, may fall. Here, the pressure ratio PR of the turbocompressor 44 is the ratio of pressure at the outlet of the turbocompressor 44 with respect to the pressure at the inlet of the turbocompressor 44. The pressure at the inlet of the turbocompressor 44 can be considered to be the atmospheric pressure. The pressure at the outlet of the turbocompressor 44 can be considered to be the pressure inside the air passage 40 of the fuel cell stack 10, that is, the cathode pressure. Therefore, the pressure ratio PR is determined in accordance with the cathode pressure. As shown in FIG. 2, the surge region SR is defined as the side in this figure where the pressure ratio PR is high and the discharge flow rate of air qATC is small, while the nonsurge region NSR is defined as the side where the pressure ratio PR is low and the discharge flow rate of air qATC is large. If the operating point of the turbocompressor 44 falls in the surge region SR, the discharge flow rate of air qATC which is actually discharged from the turbocompressor 44 and the pressure at the outlet of the turbocompressor 44 can both greatly fluctuate, that is, so-called surging can occur at the turbocompressor 44. As opposed to this, when the operating point of the turbocompressor 44 falls in the nonsurge region NSR, surging does not occur in the turbocompressor 44.

Note that, if referring to the boundary between the surge region SR and the nonsurge region NSR as the "limit pressure ratio PRL", the limit pressure ratio PRL becomes higher as the discharge flow rate of air qATC of the turbocompressor 44 becomes larger. It is also possible to view the surge region SR as being defined in the operating point region where the pressure ratio PR is higher than the limit pressure ratio PRL and the nonsurge region NSR as being defined in the operating point region where the pressure ratio PR is equal to or less than the limit pressure ratio PRL.

In this regard, if the degree of humidity of the fuel cell stack 10, in particular the membrane-electrode assembly 20, becomes excessively low, the proton conductivity falls and the membrane resistance or catalyst layer resistance increases, so the power generating performance of the fuel cell stack 10 falls, that is, so-called "dry-up" occurs.

Therefore, in an embodiment according to the present invention, it is judged if the fuel cell stack 10 is drying up. When it is judged that the fuel cell stack 10 is not drying up, normal control is performed, while when it is judged that the fuel cell stack 10 is drying up, recovery control is performed for eliminating dry-up. As a result, the power generating performance of the fuel cell stack 10 is maintained at a high level.

Next, normal control will be explained. In normal control, the cathode pressure control valve 47 is controlled so that the cathode pressure PC becomes a predetermined base cathode pressure PCB. Further, the discharge flow rate of air qATC of the turbocompressor 44 is set to the requested flow rate of air qARS of the fuel cell stack 10. Here, the requested flow rate of air qARS is set in accordance with the load of the fuel cell stack 10, that is, the amount of electricity which should be generated by the fuel cell stack 10. Furthermore, the bypass control valve 41b is controlled so that the entire amount of air which is discharged from the turbocompressor 44 is fed to the fuel cell stack 10 and thereby the flow rate of air which is fed to the fuel cell stack 10 becomes the requested flow rate of air qARS. That is, the flow rate of air qAB which is sent into the bypass pipe 41a is set to zero. In this case, the operating point of the turbocompressor 44 determined by the base cathode pressure PCB and requested flow rate of air qARS falls in the nonsurge region NSR.

Next, recovery control will be explained. In recovery control, the opening degree of the cathode pressure control valve 47 is made smaller so that the cathode pressure PC becomes an increased cathode pressure PCI higher than the base cathode pressure PCB. Further, the discharge flow rate of air qATC of the turbocompressor 44 is set to an increased air qAI larger than the requested flow rate of air qARS of the fuel cell stack 10 by an excess qAEX. Furthermore, the bypass control valve 41b is controlled so that the excess qAEX in the air which is discharged from the turbocompressor 44 flows into the bypass pipe 41a and thereby the flow rate of air which is fed to the fuel cell stack 10 is maintained at the requested flow rate of air qARS. That is, the flow rate of air qAB which is sent into the bypass pipe 41a is set to the excess qAEX. In this case, the operating point of the turbocompressor 44 determined by the increased cathode pressure PCI and requested flow rate of air qARS falls in the surge region SR, while the operating point of the turbocompressor 44 determined by the increased cathode pressure PCI and increased flow rate of air qAI falls in the nonsurge region NSR.

Figure 3:
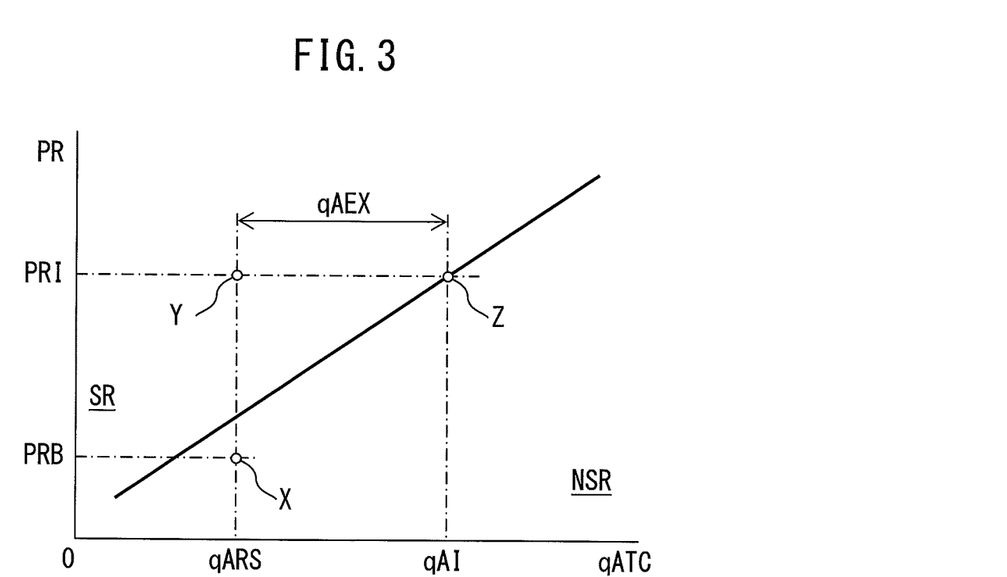
FIG. 3 is a graph which explains recovery control.

That is, if referring to the pressure ratio PR of the turbocompressor 44 when the cathode pressure PC is the base cathode pressure PCB as the "base pressure ratio PRB", the operating point of the turbocompressor 44 at the time of normal control is shown in FIG. 3 by the point X. Further, if referring to the pressure ratio PR of the turbocompressor 44 when the cathode pressure PC is the increased cathode pressure PCI as the "increased pressure ratio PRI", the operating point of the turbocompressor 44 determined by the increased cathode pressure PCI and requested flow rate of air qARS is shown in FIG. 3 by the point Y. Furthermore, the operating point of the turbocompressor 44 determined by the increased cathode pressure PCI and increased flow rate of air qAI, that is, the operating point of the turbocompressor 44 at the time of recovery control, is shown in FIG. 3 by Z.

In recovery control, if the cathode pressure PC has risen, the amount of moisture which condenses in the air passage 40 increases. Further, if the opening degree of the cathode pressure control valve 47 for making the cathode pressure PC rise is made smaller, the amount of cathode off-gas which flows out from the air passage 40 becomes smaller, so the amount of moisture which flows out to the outside of the fuel cell stack 10 accompanied with the cathode off-gas is decreased. As a result, the degree of humidity of the air passage 40 or fuel cell stack 10 rises and dry-up is eliminated. In other words, the cathode pressure PC has risen to the increased cathode pressure PCI so that dry-up is eliminated.

In this regard, if the cathode pressure PC has risen while the discharge flow rate of air qATC of the turbocompressor 44 is maintained at the requested flow rate of air qARS, the operating point Y of the turbocompressor 44 will fall in the surge region SR. Therefore, in the recovery control of the embodiment according to an embodiment of the present invention, the discharge flow rate of air qATC of the turbocompressor 44 is increased to the increased flow rate of air qAI so that the operating point Z of the turbocompressor 44 falls inside the nonsurge region NSR. Therefore, the operating point of the turbocompressor 44 is maintained inside the nonsurge region NSR.

Note that, in the embodiment according to the present invention, as shown in FIG. 3, an increased flow rate of air qAI or excess qAEX is set so that the operating point Z of the turbocompressor 44 at the time of recovery control is at the limit pressure ratio PRL. In other words, the increased flow rate of air qAI or excess qAEX is set to the smallest amount so that the operating point Z of the turbocompressor 44 just falls into the nonsurge region NSR.

As the degree of humidity of the fuel cell stack 10 becomes lower, the impedance of the fuel cell stack 10 rises. In this embodiment according to the present invention, when the impedance of the fuel cell stack 10 is a predetermined upper limit value or less, it is judged that dry-up is not occurring, while if the impedance of the fuel cell stack 10 exceeds the upper limit value, it is judged that dry-up is occurring. Further, during recovery control, when the impedance of the fuel cell stack 10 is higher than a set value which is set lower than the upper limit value, it is judged that the dry-up has not yet been eliminated, while when the impedance of the fuel cell stack 10 falls to the set value, it is judged that the dry-up has been eliminated.

Figure 4:
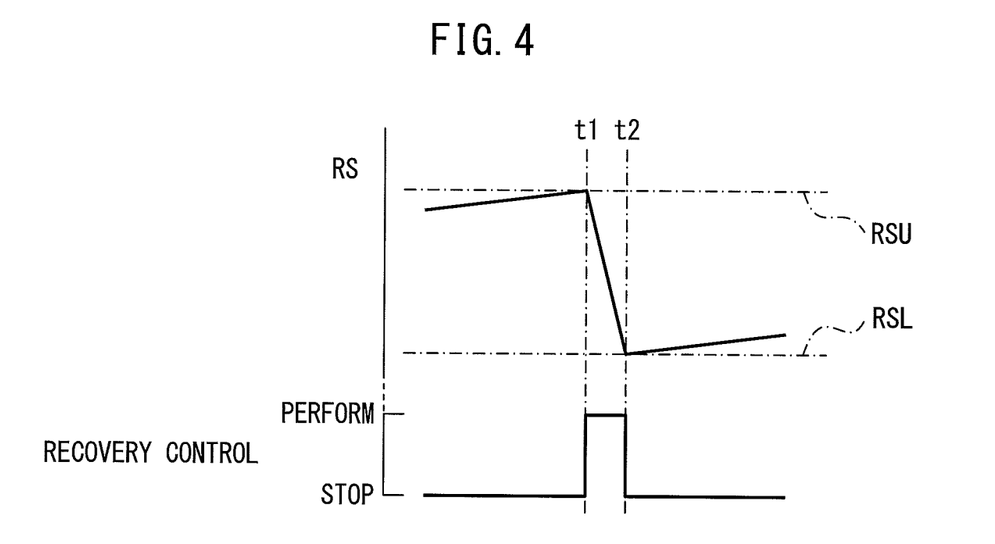
FIG. 4 is a time chart which explains an embodiment according to the present invention.

That is, as shown in FIG. 4, when the impedance RS of the fuel cell stack 10 is lower than the upper limit value RSU, recovery control is not performed, that is, normal control is performed. If, at the time t1, the impedance RS exceeds the upper limit value RSU, normal control is stopped and recovery control is started. If recovery control is performed, the degree of humidity of the fuel cell stack 10 is increased and therefore the impedance RS falls. Next, at the time t2, if the impedance RS reaches the predetermined set value RSL (<RSU), recovery control is ended and normal control is resumed.

In another embodiment (not shown), when the output voltage of the fuel cell stack 10 is lower than a predetermined threshold voltage and the impedance RS of the fuel cell stack 10 exceeds the upper limit value, it is judged that the fuel cell stack 10 is drying up, while when the output voltage of the fuel cell stack 10 is higher than the threshold voltage or when the output voltage of the fuel cell stack 10 is lower than the threshold voltage but the impedance of the fuel cell stack 10 does not exceed the upper limit value, it is judged that the fuel cell stack 10 is not drying up.

Figure 5:
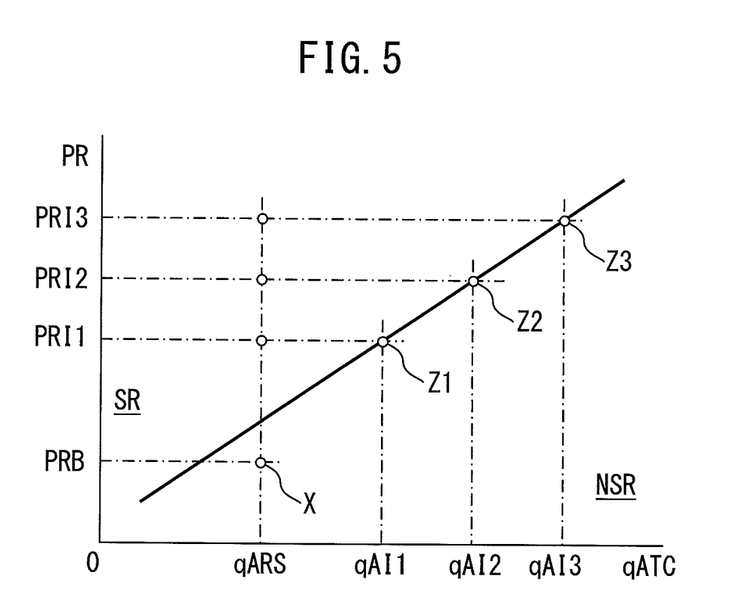
FIG. 5 is a graph which explains a plurality of combinations (PCI,qAI).

As explained above, in recovery control, the cathode pressure PC has risen to the increased cathode pressure PCI so that dry-up is eliminated, while the discharge flow rate of air qATC of the turbocompressor 44 is increased up to the increased flow rate of air qAI so that the operating point Z of the turbocompressor 44 falls in the nonsurge region NSR. In other words, when recovery control is performed, the combination (PCI,qAI) of the increased cathode pressure PCI which is required for eliminating dry-up and the increased flow rate of air qAI which is required for maintaining the operating point Z of the turbocompressor 44 inside the nonsurge region NSR is determined. In this regard, there are a plurality of combinations (PCI,qAI) for recovery control for one requested flow rate of air qARS. That is, if the pressure ratios PR of the turbocompressor 44 when the cathode pressures PC are PC1, PC2, and PC3 are expressed by respectively PR1, PR2, and PP3, in FIG. 5, when the requested flow rate of air is qARS, the operating points of the turbocompressor 44 when the combinations (PCI,qAI) are respectively set so (PCI1,qAI1), (PCI2,qAI2), and (PCI3,qAI3) are shown by Z1, Z2, and Z3. Therefore, it is necessary to determine the optimal combination (PCI, qAI) from among these plurality of combinations (PCI,qAI).

On this point, for example, in order to reduce the amount of consumed power of the turbocompressor 44 required for completion of recovery control, that is, required for elimination of dry-up, it may be considered to determine the combination (PCI,qAI) to a combination of an increased cathode pressure PCI which is low and increased flow rate of air qAI which is small. In this regard, if the increased cathode pressure PCI becomes lower, the time required for eliminating dry-up will become longer. Further, when the discharge flow rate of air is small, compared with when the discharge flow rate of air is large, the efficiency of the turbocompressor 44 will fall. Therefore, it cannot be simply said that determining the combination (PCI,qAI) to a combination of a low increased cathode pressure PCI and small increased flow rate of air qAI will enable the amount of consumed power of the turbocompressor 44 to be reduced. Similarly, even if determining the combination (PCI,qAI) to a combination of a high increased cathode pressure PCI and large increased flow rate of air qAI, the amount of consumed power of the turbocompressor 44 will not necessarily increase.

Figure 6:
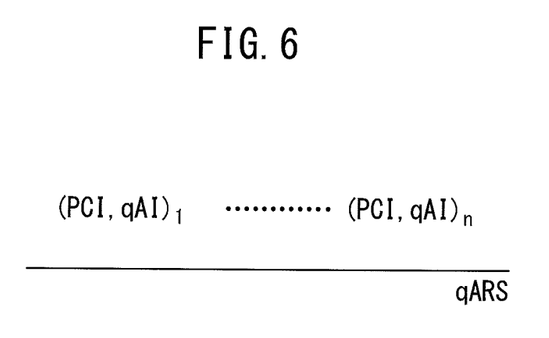
FIG. 6 is a view which shows a man of the combinations (PCI,qAI).

Therefore, in this embodiment according to the present invention, in the plurality of combinations (PCI,qAI) for recovery control, the combination (PCI,qAI) which minimizes the amount of consumed power of the turbocompressor 44 required for eliminating dry-up is found in advance by experiments and stored as a function of the requested flow rate of air qARS in the form of the map which is shown in FIG. 6 in advance in the ROM 62. In addition to the above, when performing recovery control, the map of FIG. 6 is used to determine the combination (PCI,qAI) based on she requested flow rate of air qARS. As a result, it is possible to minimize the amount of consumed power of the turbocompressor 44 and prevent surging while eliminating dry-up. Such an operation does not exist in conventional fuel cell systems.

Note that there is also known a so-called humidifying type fuel cell system which communicates the cathode off-gas pipe 46 and the air feed pipe 41 through a membrane which can pass moisture and, thus, humidifies the air which flows through the air feed pipe 41 by the cathode off-gas. As opposed to this, in the fuel cell system A which is shown in FIG. 1, the air which flows through the inside of the air feed pipe 41 is not humidified by the cathode off-gas. That is, the fuel cell system A which is shown in FIG. 1 is a non-humidifying type fuel cell system. In a non-humidifying type fuel cell system, compared with a humidifying type fuel cell system, dry-up sometimes easily occurs. However, in this embodiment according to the present invention, the above-mentioned recovery control quickly eliminates dry-up.

Figure 7:
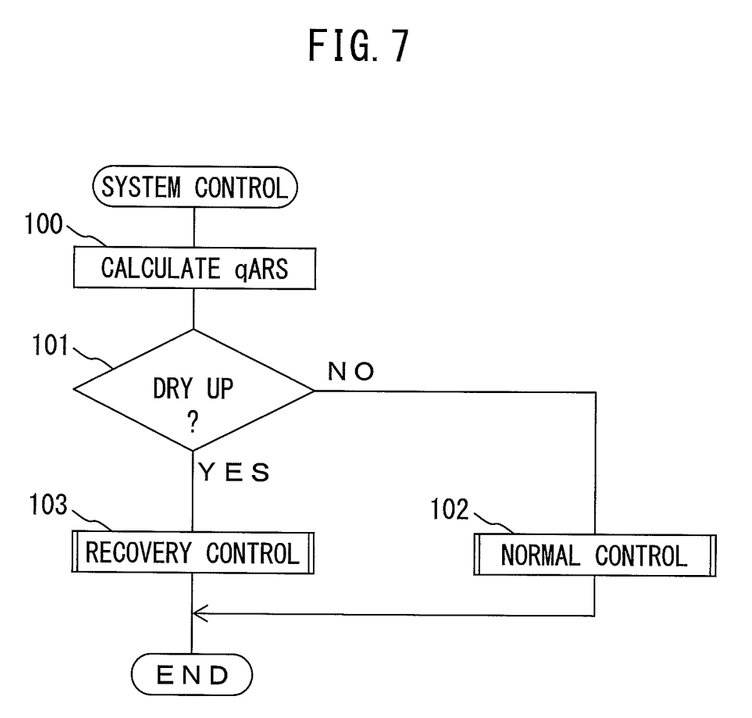
FIG. 7 is a flowchart which shows a routine for performing system control.
Figure 8:
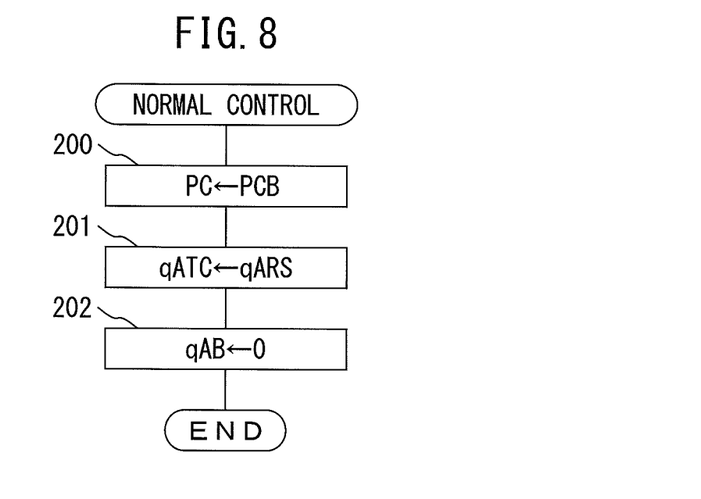
FIG. 8 is a flowchart which shows a routine for performing normal control.

FIG. 7 shows the routine for performing system control of the embodiment according to an embodiment of the present invention. This routine is performed as an interrupt routine at a predetermined frequency. Referring to FIG. 7, at step 100, the requested flow rate of air qARS of the fuel cell stack 10 is calculated based on, for example, an amount of depression of an accelerator pedal. At the next step 101, it is judged if the fuel cell stack 10 is drying up. When it is judged that the fuel cell stack 10 is not drying up, the routine proceeds to step 102 where the normal control routine for executing the above normal control is executed. This routine is shown in FIG. 8. As opposed to this, when it is judged that the fuel cell stack 10 is drying up, the routine next proceeds to step 103 where the recovery control routine for performing the above-mentioned recovery control is performed. This routine is shown in FIG. 9.

Referring to FIG. 8 which shows the normal control routine, at step 200, the opening degree of the cathode pressure control valve 47 is controlled so that the cathode pressure PC becomes the base cathode pressure PCB. At the next step 201, the turbocompressor 44 is controlled so that the discharge flow rate of air qATC becomes the requested flow rate of air qARS. At the next step 202, the bypass control valve 41*b* is controlled so that the flow rate of air qAB which flows through the inside of the bypass pipe 41*a* becomes zero.

Figure 9:
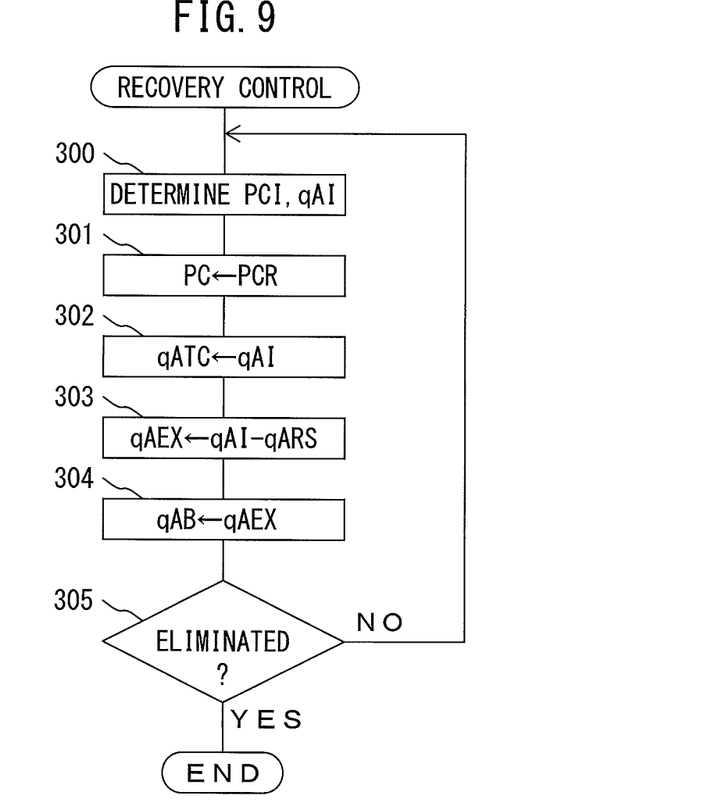
FIG. 9 is a flowchart which shows a routine for performing recovery control.

Referring to FIG. 9 which shows the recovery control routine, at step 300, the increased cathode pressure PCI and increased flow rate of air qAI are determined. At the next step 301, the opening degree of the cathode pressure control valve 47 is controlled so that the cathode pressure PC becomes the increased cathode pressure PCI. At the next step 302, the turbocompressor 44 is controlled so that the discharge flow rate of air qATC becomes the increased flow rate of air qAI. At the next step 303, the excess qAEX is calculated (qAEX=qAI−qARS). At the next step 304, the bypass control valve 41*b* is controlled so that the flow rate of air qAB which flows through the inside of the bypass pipe 41*a* becomes the excess qAEX. At the next step 305, it is judged if the dry-up has been eliminated. When it is judged that the dry-up has not been eliminated, the routine returns to step 300. When it is judged that the dry-up has been eliminated, the processing cycle is ended.

In the embodiment according to the present invention, as explained above with reference to FIG. 3, the increased flow rate of air qAI or the excess qAEX is set to the smallest amount so that the operating point Z of the turbocompressor 44 falls within the nonsurge region NSR. In another embodiment (not shown), the increased flow rate of air qAI or the excess qAEX is set to an amount larger than this smallest amount. That is, for example, the increased flow rate of air qAI is set to an amount which is larger than the above smallest amount by a fixed value or a fixed ratio. In this case as well, in the combinations (PCI,qAI) for recovery control, the combination (PCI,qAI) which minimizes the amount of consumed power of the turbocompressor 44 required for eliminating dry-up is sought.

Next, another embodiment of the combination (PCI,qAI) will be explained. The amount of consumed power of the turbocompressor 44 required for eliminating dry-up depends also on the temperature of the fuel cell stack 10, that is, the "stack temperature TS". That is, for example, if the stack temperature TS is low, the moisture in the air passage 40 easily condenses, therefore the time which is required for eliminating dry-up becomes shorter.

Figure 10:
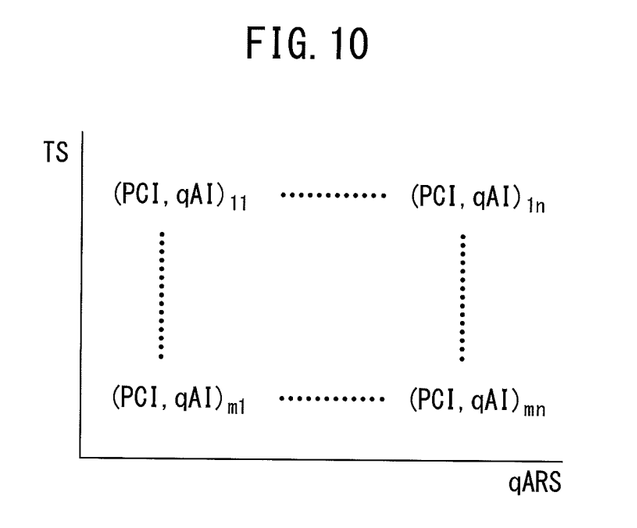
FIG. 10 is a view which shows a man of another embodiment of the combinations (PCI,qAI).

Therefore, in another embodiment of the combination (PCI,qAI), the combination (PCI,qAI) which makes minimizes the amount of consumed power of the turbocompressor 44 required for eliminating dry-up is stored as a function of the requested flow rate of air qARS and stack temperature TS in the form of the map which is shown in FIG. 10 in advance in the ROM 62. When recovery control should be performed, the may of FIG. 10 is used and the combination (PCI,qAI) is determined based on the requested flow rate of air qARS and stack temperature TS. By doing this, the combination (PCI,qAI) can be more suitably determined.

Still another embodiment of the combination (PCI,qAI) will be explained. In recovery control, the discharge flow rate of air qAI of the turbocompressor 44 is increased, so the noise and vibration of the turbocompressor 44 are liable to become excessively large. Further, air flows through the bypass control valve 41*b* and bypass pipe 41*a*, so at this time an excessively large whistling wind noise is liable to be generated. That is, if performing recovery control, the noise and vibration of the fuel cell system A are liable to become excessively large.

Therefore, in still another embodiment of the combination (PCI,qAI), the combination (PCI,qAI) is set so that the amount of consumed power of the fuel cell system A becomes the smallest in a range where the levels of the noise and vibration do not exceed predetermined allowable levels. As a result, it is possible to maintain the noise and vibration of the fuel cell system A at allowable levels or less while reducing as much as possible the amount of consumed power of the turbocompressor 44 which is required for eliminating dry-up.

Figure 11:
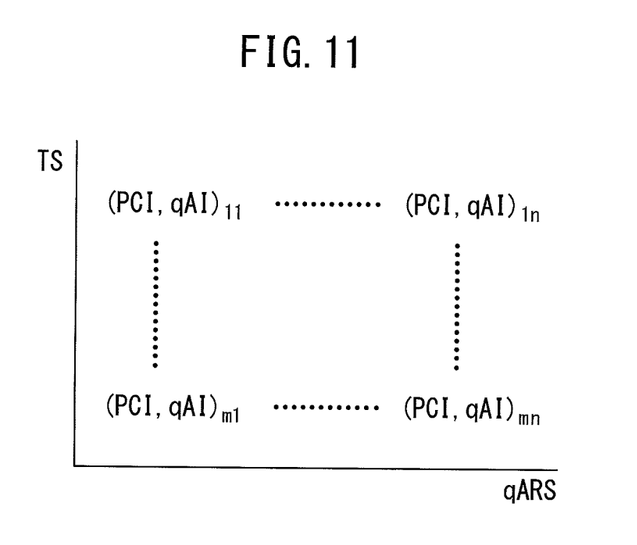
FIG. 11 is a view which shows a map of still another embodiment of the combinations (PCI,qAI).

In still another embodiment of the combination (PCI,qAI) as well, the combination (PCI,qAI) is stored as a function of the requested flow rate of air qARS and stack temperature TS in the form of a map which is shown in FIG. 11 in advance in the ROM 62.

Note that the above-mentioned allowable levels are in one example set to constant values and in another example are set so as to become higher as the running speed of the electric vehicle becomes higher.

Embodiments of the present invention can maintain the amount of consumed power of the turbocompressor small and prevent surging of the turbocompressor while reliably eliminating dry-up of the fuel cell stack.

While the invention has been described by reference to specific embodiments chosen for purposes of illustration, it should be apparent that numerous modifications could be made thereto, by those skilled in the art, without departing from the basic concept and scope of the invention.

What is claimed is:
1. A fuel cell system which comprises:
   a fuel cell stack which is configured to generate electricity by an electrochemical reaction between a fuel gas and oxidant gas;

an oxidant gas feed pipe which is connected to an inlet of an oxidant gas passage which is formed in the fuel cell stack;
a turbocompressor which is arranged in the oxidant gas feed pipe and which is configured to feed oxidant gas;
a bypass pipe which branches off from the oxidant gas feed pipe downstream of the turbocompressor;
a bypass control valve which is configured to control an amount of oxidant gas which is discharged from the turbocompressor and fed to the fuel cell stack and an amount of oxidant gas which is discharged from the turbocompressor and flows into the bypass pipe;
a cathode off-gas pipe which is connected to an outlet of the oxidant gas passage;
a cathode pressure control valve which is arranged in the cathode off-gas pipe and which is configured to control pressure inside of the oxidant gas passage as the cathode pressure; and
a controller which is configured to judge if the fuel cell stack is drying up, and is configured to perform normal control if it is judged that the fuel cell stack is not drying up and to perform recovery control for eliminating the dry-up if it is judged that the fuel cell stack is drying up,
wherein an entire region in which an operating point of the turbocompressor can fall, which is determined by a pressure ratio and discharge quantity of oxidant gas of the turbocompressor, includes a nonsurge region where surging does not occur at the turbocompressor and is defined as a side of the entire region where the pressure ratio is low and the discharge quantity of oxidant gas is high, and a surge region where surging can occur at the turbocompressor and is defined at a side where the pressure ratio is high and the discharge quantity of oxidant gas is small,
wherein, in the normal control, the cathode pressure control valve is controlled so that the cathode pressure becomes a predetermined base cathode pressure, the discharge quantity of oxidant gas of the turbocompressor is set to a requested quantity of oxidant gas of the fuel cell stack, the bypass control valve is controlled so that an entire amount of oxidant gas which is discharged from the turbocompressor is fed to the fuel cell stack to thereby make the amount of oxidant gas which is fed to the fuel cell stack equal to the requested quantity of oxidant gas, and the operating point of the turbocompressor determined by the base cathode pressure and the requested quantity of oxidant gas falls in the nonsurge region,
wherein, in the recovery control, the cathode pressure control valve is controlled so that the cathode pressure becomes an increased cathode pressure higher than the base cathode pressure, the discharge quantity of oxidant gas of the turbocompressor is set to an increased quantity of oxidant gas greater than the requested quantity of oxidant gas of the fuel cell stack by an excess, the bypass control valve is controlled so that the excess in the oxidant gas which is discharged from the turbocompressor flows into the bypass pipe to thereby maintain the amount of oxidant gas which is fed to the fuel cell stack at the requested quantity of oxidant gas, and the operating point of the turbocompressor determined by the increased cathode pressure and the requested quantity of oxidant gas falls in the surge region and the operating point of the turbocompressor determined by the increased cathode pressure and the increased quantity of oxidant gas falls in the nonsurge region, and,
wherein, in the recovery control, furthermore, a combination of the increased cathode pressure and the increased quantity of oxidant gas which minimizes an amount of consumed power of the turbocompressor required for eliminating the dry-up is set based on the requested quantity of oxidant gas of the fuel cell stack.

2. The fuel cell system according to claim 1, wherein, in the recovery control, the combination of the increased cathode pressure and the increased quantity of oxidant gas which minimizes the amount of consumed power of the turbocompressor is set based on the requested quantity of oxidant gas and temperature of the fuel cell stack.

3. The fuel cell system according to claim 1, wherein, in the recovery control, the combination is set so that the amount of consumed power of the turbocompressor is minimized such that levels of noise and vibration of the fuel cell system do not exceed predetermined allowable levels.

4. The fuel cell system according to claim 1, wherein the fuel cell system is of a non-recirculating fuel gas type.

5. The fuel cell system according to claim 1, wherein the fuel cell system is of a non-humidifying oxidant gas type.

* * * * *